(12) United States Patent
Pejovic et al.

(10) Patent No.: US 12,474,207 B2
(45) Date of Patent: Nov. 18, 2025

(54) LIGHT SENSOR AND A METHOD FOR MANUFACTURING A LIGHT SENSOR

(71) Applicants: IMEC VZW, Leuven (BE); Katholieke Universiteit Leuven, Leuven (BE)

(72) Inventors: Vladimir Pejovic, Heverlee (BE); David Cheyns, Heffen (BE); Xavier Rottenberg, Kessel-Lo (BE); Kristof Lodewijks, Wilsele (BE); Pawel Malinowski, Heverlee (BE); Yunlong Li, Heverlee (BE); Gauri Karve, Tervuren (BE)

(73) Assignees: IMEC VZW, Leuven (BE); Katholieke Universiteit Leuven, Leuven (BE)

( * ) Notice: Subject to any disclaimer, the term of this patent is extended or adjusted under 35 U.S.C. 154(b) by 169 days.

(21) Appl. No.: 18/197,357

(22) Filed: May 15, 2023

(65) Prior Publication Data

US 2023/0375406 A1  Nov. 23, 2023

(30) Foreign Application Priority Data

May 17, 2022 (EP) ..................................... 22173916

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0205* (2013.01); *G01J 3/021* (2013.01); *G01J 3/0259* (2013.01);
(Continued)

(58) Field of Classification Search
CPC ........ G01J 3/2823; G01J 3/0205; G01J 3/021; G01J 3/0259; G01J 3/26; G01J 3/2803;
(Continued)

(56) References Cited

U.S. PATENT DOCUMENTS 5,726,805 A    3/1998  Kaushik et al.
2012/0327248 A1  12/2012  Tack et al.
(Continued)

FOREIGN PATENT DOCUMENTS

CN       111816717 A   * 10/2020   ....... H01L 31/02327

OTHER PUBLICATIONS

Lai, Kuo-Wei, et al. "Selecting detection wavelength of resonant cavity-enhanced photodetectors by guided-mode resonance reflectors." Optics Express 20.4 (2012): 3572-3579 (Year: 2012).*
(Continued)

*Primary Examiner* — Dominic J Bologna
(74) *Attorney, Agent, or Firm* — MOSER TABOADA

(57) ABSTRACT

A light sensor for spectrally resolved light detection, said light sensor comprises: an upper reflective element; a lower reflective element; a photo-sensitive element therebetween; a spacer element, configured to form the lower reflective element or arranged between the upper and the lower reflective element; wherein the elements form a stack of layers which define a resonance structure between the upper and the lower reflective element for providing a resonance of light; wherein the spacer element comprises at least two different materials, a distribution of which is different between different pixels in an array of pixels such that a resonance wavelength is different for different pixels; and wherein for a plurality of pixels, geometrical structures smaller than the resonance wavelength are defined by the at least two different materials.

16 Claims, 3 Drawing Sheets

(51) Int. Cl.
  *G01J 3/26* (2006.01)
  *G01J 3/36* (2006.01)
  *H10K 39/32* (2023.01)

(52) U.S. Cl.
  CPC .............. *G01J 3/26* (2013.01); *G01J 3/2803* (2013.01); *G01J 3/36* (2013.01); *H10K 39/32* (2023.02); *G01J 2003/2826* (2013.01)

(58) Field of Classification Search
  CPC .... G01J 3/36; G01J 2003/2826; H10K 39/32; H01L 31/02327
  See application file for complete search history.

(56) References Cited

U.S. PATENT DOCUMENTS

2014/0353506 A1* 12/2014 Nam .................... G01J 5/20 250/349
2018/0374981 A1* 12/2018 Carr ..................... H01L 31/147
2020/0284660 A1* 9/2020 Seo ........................ G01J 3/42

OTHER PUBLICATIONS

20. Chen, Qimiao, et al. "Transferable single-layer GeSn nanomembrane resonant-cavity-enhanced photodetectors for 2 μm band optical communication and multi-spectral short-wave infrared sensing." Nanoscale 14.19 (2022): 7341-7349 (Year: 2022).*
English machine translation of CN111816717A (Year: 2020).*
Zhao et al: "Simulation of Resonant Cavity-Coupled Colloidal Quantum-Dot Detectors with Polarization Sensitivity", Coatings, 12, 499, pp. 1-8, 2012.
Lai et al: "Selecting detection wavelength of resonant cavity-enhanced photodetectors by guided-mode resonance reflectors", Optics Express 3572, vol. 20, No. 4, pp. 1-8, 2012.
Horie et al: "Wide bandwidth and high resolution planar filter array based on DBR-metasurface—DBR structures", Optics Express 11677, vol. 24, No. 11, pp. 1-6, 2016.
Koeppe et al: "One- and two-photon photocurrents from tunable organic microcavity photodiodes", Applied Physics Letters, vol. 82, No. 16, pp. 1-3, 2003.
Wang et al: "Organic Cavity Photodetectors Based on Nanometer-Thick Active Layers for Tunable Monochromatic Spectral Response", ACS Photonics, vol. 6, pp. 1393-1399, 2019.
Joo et al: "Metasurface-driven OLED displays beyond 10,000 pixels per inch", Science 370, pp. 459-463, 2020.
Siegmund et al: "Organic narrowband near-infrared photodetectors based on intermolecular charge-transfer absorption", Nature Communications, 8:15421, pp. 1-6, 2017.
Tang et al: "Acquisition of Hyperspectral Data with Colloidal Quantum Dots", Laser Photonics Reviews, vol. 13, 1900165, pp. 1-8, 2019.
Walls et al: "Narrowband multispectral filter set for visible band", Optics Express 21917, vol. 20, No. 20, pp. 1-7, 2012.
Chen et al: "Transferable single-layer GeSn nanomembrane resonant-cavity-enhanced photodetectors for 2 μm band optical communication and multi-spectral short-wave infrared sensing", Nanoscale, vol. 14, No. 19, pp. 7341-7349, 2022.
Extended European Search Report for Application No. EP22173916.2 dated Nov. 9, 2022.

* cited by examiner

LIGHT SENSOR AND A METHOD FOR MANUFACTURING A LIGHT SENSOR

CROSS-REFERENCE TO RELATED APPLICATIONS

The present application claims the benefit of and priority to EP Patent Application Serial No. 22173916.2, filed May 17, 2022, the entire contents of which is incorporated herein by reference.

TECHNICAL FIELD

The present description relates to a light sensor and to a method for manufacturing a light sensor. In particular, the present description relates to a light sensor which may be manufactured using thin-film deposition techniques.

BACKGROUND

In many different applications, there is an interest of acquiring spectral information. For instance, spectrally resolved detection of light may be used in order to detect spectral information of an object, such as for analyzing a chemical composition of an object. Spatial information of the object may be simultaneously acquired in order to provide spectrally and spatially resolved information of the object.

A light sensor may thus comprise photo-sensitive element(s) forming an array of pixels, wherein different pixels may be configured to detect different wavelength bands in order to acquire spectral information. The pixels may be arranged in groups comprising a sub-set of pixels of the array for defining spectrally resolved information for a particular point of an object and multiple groups may be repetitively arranged on the light sensor for acquiring spectral and spatial information for spectral imaging. The pixels may be associated with different filters in order to define different wavelength bands to be detected by the different pixels. The filters may be arranged above the photo-sensitive element(s) such that incident light reaches a filter, and the filter allows a specific wavelength band to pass the filter to be detected by the photo-sensitive element.

Fabry-Pérot filters may be used for defining wavelength bands of the pixels. A Fabry-Pérot filter uses two reflective surfaces which are spaced apart such that constructive interference of light having traveled different number of times between the reflective surfaces may be formed. By changing an effective refractive index of a material between the two reflective surfaces, a resonant wavelength of the Fabry-Perot filter is changed.

The photo-sensitive elements may be formed using thin-film technology. This may be useful in particular if spectral information extending into wavelength ranges beyond a visible range, such as infrared wavelengths, is desired. However, forming of a Fabry-Pérot filter on photo-sensitive elements formed through thin-film technology may damage or harm the photo-sensitive element.

Thus, there is a need for a set-up of a light sensor, which could be based on thin-film technology for acquisition of spectral information, without harming photo-sensitive elements that are formed with thin-film technology.

SUMMARY

An objective of the present description is to provide a light sensor which allows flexibility in manufacturing of the light sensor. In particular, an objective of the present description is to provide a light sensor for acquisition of spectral information that may be manufactured using thin-film technology.

These and other objectives are at least partly met by the invention as defined in the independent claims. Preferred embodiments are set out in the dependent claims.

According to a first aspect, there is provided a light sensor for spectrally resolved light detection, said light sensor comprising: an upper reflective element; a lower reflective element; a photo-sensitive element arranged between the upper reflective element and the lower reflective element; a spacer element, which is configured to form the lower reflective element or is arranged between the upper reflective element and the lower reflective element; wherein the elements form a stack of layers with the elements arranged in mutually unique planes, parallel to each other, and wherein the stack of layers define a resonance structure between the upper reflective element and the lower reflective element for providing a resonance of light dependent on a wavelength of the light; wherein the spacer element comprises at least two different materials, wherein a distribution of the at least two different materials in a direction parallel to a plane of the spacer element is different between different pixels in an array of pixels of the light sensor such that a resonance wavelength is different for different pixels; and wherein, for a plurality of pixels in the array of pixels, geometrical structures having a size smaller than the resonance wavelength are defined by the at least two different materials, and wherein, for a plurality of pixels in the array of pixels, the spacer element is formed as a metamaterial, wherein periodicity of the geometrical structures is sufficiently low such that light diffraction of the resonance wavelength is not caused by the metamaterial.

Thanks to the light sensor of the first aspect, the photo-sensitive element is arranged between the upper reflective element and the lower reflective element. This implies that the photo-sensitive element is arranged within a resonance structure formed between the upper reflective element and the lower reflective element. Hence, the entire resonance structure need not be formed above the photo-sensitive element. The resonance structure ensures that the photo-sensitive element will detect light within a well-defined wavelength band.

The light sensor comprises a spacer element which is configured to form the lower reflective element or is arranged between the upper reflective element and the lower reflective element. The spacer element may thus control a resonance wavelength of the resonance structure. The spacer element may be patterned in order to provide a distribution of the at least two different materials of the spacer element.

The spacer element may have a common thickness (in a direction perpendicular to the plane of the spacer element) for the pixels in the array of pixels. Thus, different resonance wavelengths need not be achieved by using layers having different thickness. This implies that the thickness of the resonance structure may be equal for the pixels, which may facilitate manufacturing of the light sensor.

Thanks to the photo-sensitive element being arranged between the upper reflective element and the lower reflective element, the photo-sensitive element is also arranged within the resonance structure. This implies that a filter for selecting wavelength need not be entirely arranged above the photo-sensitive element. This may further facilitate manufacturing of the light sensor, since at least some layers of the resonance structure which may need to be patterned need not be formed on the photo-sensitive element. Thus, the photo-sensitive element may be formed after manufacturing steps for patterning a layer have already been performed, such that the photo-sensitive element is not affected by such manufacturing steps.

Thanks to the photo-sensitive element being arranged in the resonance structure, the spacer element may in embodiments be arranged below the photo-sensitive element, i.e., the spacer element may be configured to form the lower reflective element or may be arranged between the photo-sensitive element and the lower reflective element.

The stack of layers may be arranged above read-out circuitry for reading out signals representative of light incident on the photo-sensitive elements. Thus, during manufacturing of the light sensor, the layers in the stack of layers may be formed in an order where layers arranged close to the read-out circuitry are formed before layers arranged further away from the read-out circuitry.

With the spacer element arranged between the photo-sensitive element and the lower reflective element, the photo-sensitive element may be formed after the spacer element has already been formed. This implies that any manufacturing steps for forming the spacer element, such as patterning required for forming the spacer element does not affect the photo-sensitive element. Hence, the photo-sensitive element will not be harmed by forming of the spacer element. Forming of remaining parts of the light sensor after the photo-sensitive element has been formed need not affect the photo-sensitive element and these remaining parts may for instance be formed without requiring high-precision optical lithography.

However, it should be realized that in other embodiments, the spacer element may be arranged between the photo-sensitive element and the upper reflective element.

According to another aspect, there is provided a light sensor for spectrally resolved light detection, said light sensor comprising: an upper reflective element; a lower reflective element; a photo-sensitive element arranged between the upper reflective element and the lower reflective element; a spacer element, which is arranged between the upper reflective element and the lower reflective element; wherein the elements form a stack of layers with the elements arranged in mutually unique planes, parallel to each other, and wherein the stack of layers define a resonance structure between the upper reflective element and the lower reflective element for providing a resonance of light dependent on a wavelength of the light; wherein the spacer element comprises at least two different materials, wherein a distribution of the at least two different materials in a direction parallel to a plane of the spacer element is different between different pixels in an array of pixels of the light sensor such that a resonance wavelength is different for different pixels; wherein, for a plurality of pixels in the array of pixels, geometrical structures having a size smaller than the resonance wavelength are defined by the at least two different materials.

This implies that the spacer element is separate from the lower reflective element. Hence, each of the spacer element and the lower reflective element may be separately designed for providing respective functionalities of controlling a resonance wavelength and providing reflection of light, respectively. This ensures that there is a large design freedom compared to a single element providing both functionalities.

It should be realized that even though the light sensor of the first aspect may be particularly advantageous in facilitating that the light sensor is manufactured using thin-film technology, the light sensor is not limited to manufacturing by thin-film technology. On the contrary, the light sensor of the first aspect may be applied to bulk semiconductor technology.

The light sensor may be configured to detect light in a plurality of wavelength bands, wherein different wavelength bands are detected in different pixels of an array of pixels. Thus, the light sensor provides spectrally resolved light detection. The light sensor may be used for obtaining merely spectral information content and may in such case comprise one or a few pixels dedicated to each wavelength band to be detected.

The light sensor may be configured to provide spatial resolution in addition to the spectral resolution of incident light. This implies that pixels dedicated to a same particular wavelength are repeated in the array of pixels and that pixels dedicated to different wavelengths are alternatingly arranged in the array of pixels. Thus, pixels may be arranged in groups comprising a sub-set of pixels, wherein each sub-set of pixels provides spectral resolution of light and identical groups (sub-sets of pixels) are repeated over the array of pixels for providing spatial resolution of light. In this manner, the light sensor may form an image sensor such that an image with spatial and spectral resolution may be formed based on the light detected by the light sensor.

It should be realized that the arrangement of pixels being dedicated to different wavelengths in an array of pixels may be varied in numerous ways depending on the information that is desired to be acquired. The array of pixels may for instance form a one-dimensional or a two-dimensional array.

As used herein, the term "light" should be interpreted as electro-magnetic radiation which is not limited to wavelengths corresponding to visible light. Rather, the light may be electro-magnetic radiation of other wavelengths, such as ultraviolet light or infrared light.

The upper reflective element and the lower reflective element are arranged to reflect light in a broad range of wavelengths such that a resonance structure is formed between the upper reflective element and the lower reflective element. The resonance structure may form a Fabry-Pérot filter. Light will thus be reflected back and forth between the upper reflective element and the lower reflective element. Interference may thus occur between light having passed different numbers of round-trips between the upper reflective element and the lower reflective element. If an optical path back and forth between the upper reflective element and the lower reflective element (one round-trip) corresponds to an integer number of a wavelength of light, constructive interference will occur. This implies that the resonance structure may, dependent on the optical path between the upper reflective element and the lower reflective element, provide constructive interference (resonance) for different wavelengths (resonance wavelength) of light.

The upper reflective element and the lower reflective element may be reflective over a broad range of wavelengths. Thus, the same upper reflective element and lower reflective element may be used for forming resonance structures that are selective to different wavelength bands within the broad range of wavelengths for which the upper reflective element and the lower reflective element are reflective. The upper reflective element and the lower reflective element may be highly reflective such that there are low losses of light at round-trips of the light in the resonance structure. For higher reflectivity of the reflective elements, the resonance structure is able to define a narrower wavelength band for which light will be detected by the photo-sensitive element.

For example, the upper reflective element and the lower reflective element may have a reflectivity of more than 70%, such as more than 90%, such as more than 95%, for light in the range of wavelengths. With a higher reflectivity, spectral resolution of the pixels may be improved. The upper reflective element and the lower reflective element need not have equal reflectivity in the range of wavelengths. However, the light sensor may provide a good spectral resolution when the upper reflective element and the lower reflective element exhibit equal or similar reflectivity.

In an embodiment, the light sensor is configured to receive light to be detected through the upper reflective element. This implies that light to be detected by the photo-sensitive element may enter the resonance structure through the upper reflective element.

The distribution of the at least two different materials in the spacer element may control a refractive index of the spacer element. This implies that the optical path through the spacer element may be changed in dependence of the distribution of the at least two different materials and that the overall optical path between the upper reflective element and the lower reflective element may be changed such that the resonance wavelength is affected. The spacer element may thus be transparent to the resonance wavelength and the effective refractive index of the spacer element may depend on the distribution of the at least two different materials. However, if one of the materials in the spacer element is a metal, light will not penetrate through the metal. Thus, refractive index of the spacer element may not be changed, but plasmonic effects may instead affect phase of light being reflected, so as to affect the resonance wavelength depending on the distribution of the metal and another material in the spacer element.

According to an embodiment of the first aspect, the spacer element is configured to form the lower reflective element. This implies that the spacer element is configured to reflect light. The distribution of the at least two different materials may control an effective distance into the spacer element at which reflection occurs so as to control the resonance wavelength, or plasmonic effects may affect the resonance wavelength.

The stack of layers is arranged such that layers are arranged one layer above another. Each layer may define a plane having a small thickness transverse to the plane and a larger extension in directions parallel to the plane. The stack may thus be formed such that layers are arranged above each other, with the planes of the layers being parallel to each other. It should be realized that each of the elements, the upper reflective element, the photo-sensitive element, the spacer element, and the lower reflective element may be formed by one or more layers in the stack. For instance, the upper reflective element may be formed by a plurality of layers forming a distributed Bragg reflector. Thus, one layer in the stack does not necessarily correspond to one of the elements.

As mentioned, thin-film technology may be used when forming at least some of the layers of the stack of layers. Thin-film technology may involve deposition of a material onto a surface such that a thin film (e.g., having a thickness in a range of a fraction of a nanometer to micrometers) is formed on the surface. The deposition of material may form a layer which has a homogeneous thickness.

Whereas the spacer element may require patterning to form very small structures in the direction of the plane of the spacer element, the photo-sensitive element and the upper reflective element may not need such patterning. Thus, at least the photo-sensitive element and the upper reflective element may be suitably formed using thin-film technology. The photo-sensitive element and the upper reflective element may even extend continuously over a plurality of pixels or over the entire array of pixels. Pixels may be defined within the array by patterning of the spacer element and the lower reflective element such that separate resonance structures are defined, and that light of different wavelengths may be separately detected in separate pixels.

The spacer element may be formed as a metamaterial. Properties of the spacer element may thus be defined by shape, geometry, size and/or orientation of structures of the at least two different materials in the spacer element.

In particular, geometry of the structures of the materials in the spacer element may be used for modulating an effect of the spacer element on light propagation in the resonance structure, such as for modulating a refractive index of the spacer element. The geometrical structures defined by the at least two different materials may be smaller than the resonance wavelength of light of the pixels, such as being smaller than $1/3$, $1/5$ or $1/10$ of the resonance wavelength.

The geometrical structures of the spacer element may be sufficiently small such that the geometrical structures of the spacer element do not cause diffraction of the resonance wavelength. In addition, a periodicity of the geometrical structures of the spacer element may be sufficiently low such that light diffraction of the resonance wavelength is not caused by the metamaterial.

The geometrical structures may be formed within at least one of the at least two different materials. Hence, very small geometrical structures may be formed in a first material and the geometrical structures may be defined by the first material being surrounded by a second material (which may be continuous around the geometrical structures of the first material). Thus, according to an embodiment, the spacer element may comprise, for each pixel of the plurality of pixels, a plurality of separate geometrical structures of the first material, wherein the separate geometrical structures are separated by the second material along the direction parallel to the plane of the spacer element.

The geometrical structures having a size smaller than the resonance wavelength implies that the geometrical structures have a small size in at least one dimension parallel to the plane of the spacer element. The spacer element may be patterned in two dimensions such that a maximum extension of the geometrical structure in the plane of the spacer element is smaller than the resonance wavelength. For instance, the geometrical structures may have a circular or square cross-section in the plane of the spacer element. However, it should be realized that other shapes of the geometrical structures may be used, such as irregular shapes.

However, the spacer element may be patterned such that geometrical structures may have a relatively large extension in a first direction of the plane of the spacer element while being small in a second direction transverse to the first direction. Thus, the geometrical structures may form stripes in the spacer element. The geometrical structures still have a size smaller than the resonance wavelength, in that the size of the geometrical structures in at least the second direction is smaller than the resonance wavelength.

According to an embodiment, the spacer element comprises, for a pixel in the array of pixels, a plurality of geometrical structures extending in parallel in a first direction of the plane of the spacer element, wherein the geometrical structures have a size smaller than the resonance wavelength in a second direction perpendicular to the first direction. In such case, the geometrical structures may further provide a polarization dependent interaction with light, such that the light sensor may detect light in dependence of polarization of light as well as wavelength of light.

Each of the plurality of pixels may comprise a plurality of geometrical structures. The geometrical structures may be identical and may be arranged in a regular pattern with an equal distance between adjacent geometrical structures. This may facilitate that the spacer element provides an easily predictable interaction with light such that design of the spacer element is simplified. However, it should be realized that the geometrical structures need not necessarily be identical within a pixel and need not necessarily be arranged in a regular pattern.

It should be realized that the spacer element may comprise geometrical structures in a plurality of pixels but not necessarily in all of the pixels of the array of pixels. For instance, if the at least two different materials are used for controlling an effective refractive index of the spacer element in the pixels, the spacer element may for some pixels be formed completely by one of the materials. Hence, in such pixels, the refractive index is controlled by the one material. However, in order to provide different resonance wavelengths for the pixels, typically providing a multitude of resonance wavelengths in the light sensor, geometrical structures of the spacer element may be used in a plurality of pixels and the distribution of the at least two different materials may be different for different pixels among the plurality of pixels.

Since the spacer element may comprise structures of very small size in the direction parallel to the plane of the spacer element, the forming of the spacer element may involve steps commonly used in bulk semiconductor manufacturing, such as lithography and etching. Since the spacer element may be formed before the photo-sensitive element is formed, the manufacturing steps for forming the spacer element will in such case not affect the photo-sensitive element.

The distribution of the at least two different materials being different between different pixels implies that the two different materials are differently arranged in the different pixels. For instance, a density of the two different materials may be different between different pixels such that a ratio of amount of first material to amount of second material is different between different pixels. Also or alternatively, a pattern of the geometrical structures may be different, such that a size, shape, orientation and/or distance between the geometrical structures and/or number of geometrical structures is different for different pixels.

The spacer element may be configured to form the lower reflective element. Alternatively, the spacer element may be arranged between the lower reflective element and the photo-sensitive element. According to yet another alternative, the spacer element may be arranged between the photo-sensitive element and the upper reflective element.

It should be realized that a pixel in the array of pixels correspond to one resonance structure. Thus, the pixel may represent an intensity of light of the resonance wavelength. A plurality of pixels may be combined in an image for forming a single image point having spectrally resolved information.

According to an embodiment, the distribution of the at least two different materials controls an effective refractive index of the spacer element.

The effective refractive index of the spacer element affects an optical path length of light through the spacer element. Thus, by changing the effective refractive index of the spacer element, the resonance wavelength of the resonance structure may be changed.

According to an embodiment, the spacer element is configured to enable flow of charges from the photo-sensitive element through the spacer element.

This implies that the spacer element provides an electrical function of the light sensor in addition to controlling the resonance wavelength of the pixels of the light sensor. The flow of charges through the spacer element may contribute to transporting charges generated by light being absorbed by the photo-sensitive element away from the photo-sensitive element. The flow of charges through the spacer element may also or alternatively contribute to accumulation of charges for reading out a signal representative of the light being incident on the photo-sensitive element.

This implies that even if the spacer element is arranged between the photo-sensitive element and read-out circuitry, charges generated by the photo-sensitive element may be transported through the spacer element towards the read-out circuitry such that a signal from the photo-sensitive element may still be read out.

The read-out circuitry may comprise an electrode at which charges are received. The read-out circuitry may further comprise components for reading out a value corresponding to the amount of charges at the electrode, such as reading a voltage potential formed at the electrode.

The spacer element may be configured to enable the flow of charges by at least one of the first material or the second material of the spacer element being configured to allow charges to be conducted therethrough (being conductive or semi-conductive). Alternatively, the spacer element may be configured to enable flow of charges through a third material, which may be configured to allow charges to be conducted therethrough (being conductive or semi-conductive). The third material may be arranged in the spacer element so as not to contribute to controlling the resonance wavelength of the different pixels.

The structures of the spacer element may extend through an entire thickness of the spacer element. This implies that, if flow of charges is allowed through the material of a structure, the structure may allow for conducting charges through the entire thickness of the spacer element as the structure extends through the entire thickness.

The spacer element need not be arranged in contact with the photo-sensitive element. Thus, the stack of layers may comprise additional elements between the spacer element and the photo-sensitive element. Hence, the spacer element being configured to enable flow of charges from the photo-sensitive element does not necessarily mean that the spacer element receives charges directly from the photo-sensitive element. Rather, the spacer element may form any part of a flow of charges originating from the photo-sensitive element. The flow of charges may flow in a direction transverse to the plane of the spacer element such that charges flow through the spacer element.

The flow of charges from the photo-sensitive element may be directed towards a read-out circuitry for reading out a signal representative of light incident on the photo-sensitive element. The read-out circuitry may be arranged such that the lower reflective element is arranged between the read-out circuitry and the photo-sensitive element. This implies that the flow of charges may need to flow in a direction transverse to the plane of the spacer element through the spacer element in order for charges to be transported from the photo-sensitive element for reading out a signal by the read-out circuitry.

The flow of charges through the spacer element may act to transport charges away from the photo-sensitive element such that charges in the photo-sensitive element do not affect further detection of light by the photo-sensitive element. The spacer element may in such case be arranged between the photo-sensitive element and an electrical contact element which may be configured to control transport of charges away from the photo-sensitive element.

The spacer element may in an alternative embodiment be arranged between the photo-sensitive element and the upper reflective element, while not being arranged between the photo-sensitive element and an electrical contact element. In such case, the spacer element need not necessarily provide a flow of charges therethrough.

According to an embodiment, a first material of the at least two different materials is configured to enable flow of charges through the spacer element and wherein the first material of the spacer element is semi-conductive.

Thus, the flow of charges through the spacer element may be provided by at least the first material which is also used for controlling the resonance wavelength of a pixel. This implies that the first material may be selected in order to be able to control the resonance wavelength of light and also to be able to provide conduction of charges through the spacer element.

The first material may be semi-conductive. The first material may still provide sufficient conduction of charges for supporting the flow of charges from the photo-sensitive element. Use of a semi-conductive material may be useful for providing accurate control of the resonance wavelength.

It should be realized that both the first material and the second material (and any further materials of the spacer element) contributing to control of the resonance wavelength may enable flow of charges through the spacer element.

According to an alternative embodiment, the spacer element comprises a third material configured to enable flow of charges through the spacer element. The third material may be formed as a via extending through the spacer element in a direction transverse to the plane of the spacer element.

The third material may be arranged in a corresponding manner for each pixel of the light sensor such that any effect of the third material on the resonance wavelength is similar for each pixel. Hence, the resonance wavelength being different for different pixels may be achieved by the distribution of the at least two different materials of the spacer element, wherein the third material does not contribute to controlling the resonance wavelength to be different for different pixels.

According to an embodiment, the first material of the spacer element is a metal, semiconductor, or a dielectric material and a second material of the at least two different materials of the spacer element is a metal, a semiconductor, or a dielectric material.

Thus, it should be realized that the first material and the second material of the spacer element may be selected from a group comprising metal, semiconductor, and dielectric material. If a metal is used, flow of charges through the spacer element may be provided through the metal. Similarly, if a semiconductor is used, flow of charges through the spacer element may be provided through the metal.

The materials of the first material and the second material may be selected so as to allow resonance wavelengths to be tuned to desired wavelengths in the pixels of the light sensor. If the first material and the second material are both dielectric materials, the third material as described above providing flow of charges through the spacer element may also be needed.

If at least one of the first material or the second material is a metal or a semiconductor, the spacer element may provide flow of charges through such material.

According to an embodiment, the first material may be a metal and the second material may be a dielectric material or a semiconductor. Light may not propagate through the metal such that the light may only propagate through the dielectric material for passing through the spacer element. However, the resonance wavelength of a pixel may be affected by plasmonic effects caused by presence of the metal such that the resonance wavelength may be dependent on the distribution.

The first material and the second material may both be metals. In such case, the spacer element may not allow light to propagate through the spacer element and the spacer element may be configured to form the lower reflective element. The distribution of the at least two materials may affect plasmonic effects so as to control the resonance wavelength of a pixel.

According to an embodiment, for each pixel, the spacer element comprises a first region and a second region, wherein the first material is arranged in the first region in a common manner for all pixels, and wherein the distribution of the at least two different materials in the second region is different between different pixels.

This implies that the first material in the first region of each pixel may provide flow of charges through the spacer element. Hence, the flow of charges for each pixel may be provided based on an identical pattern of the first material in the first region of the spacer element. Properties for conducting charges through the spacer element may thus be similar for all pixels such that read-out of signals from the light sensor need not be affected by different properties for conducting charges.

The first region may for instance have a shape of a ring which may surround the second region. This implies that the flow of charges may be symmetrically arranged in a vertical direction of the pixel through the stack of layers, such that read-out of signals from a pixel is insensitive to different distribution of charges in a lateral direction of the pixel.

According to an alternative, the spacer element comprises a third material which is arranged in the first region of the spacer element in a common manner for all pixels. Thus, the third material may provide flow of charges through the spacer element. A distribution of the first material and the second material in the second region of the spacer element may then control the resonance wavelength of the pixel.

According to an embodiment, a height of structures of at least one of the two different materials in the second region is different between different pixels.

A height of a structure may be defined as a size of the structure in a direction transverse to the plane of the spacer element.

Since flow of charges may be provided through the spacer element in the first region, flow of charges need not occur at all through the second region. For example, if the first material is used for providing flow of charges through the spacer element, the first material may provide flow of charges through the spacer element in the first region and the first material need not extend through an entire thickness of the spacer element in the second region (as no flow of charges is needed through the second region). This implies that a further parameter is provided for controlling properties of the spacer element and controlling the resonance wavelength, as the height of the structures may also be varied between different pixels.

According to an embodiment, the photo-sensitive element comprises quantum dots, configured to detect infrared light, such as short-wave infrared, (SWIR) light, or mid-wave infrared (MWIR) light.

Quantum dots, such as colloidal quantum dots, may be used for allowing detection of light of wavelengths extending into the infrared range, such as for detection of SWIR or MWIR light. Further, a photo-sensitive element comprising colloidal quantum dots formed by thin-film technology may be very sensitive and easily affected by manufacturing steps after the photo-sensitive element has been formed. Thus, the light sensor that may provide a spacer element being formed before the photo-sensitive element is formed may be particularly suitable for using quantum dots in the photo-sensitive element.

However, it should be realized that the photo-sensitive element may be formed in many other ways. Thus, the photo-sensitive element may comprise an organic material, a perovskite material, a semiconductor material, such as germanium (Ge) or indium arsenide (InAs). The photo-sensitive element may be selected in view of the range of wavelengths that is to be detected by the light sensor.

According to an embodiment, the light sensor further comprises a substrate carrying read-out circuitry for reading out signals from the photo-sensitive element for each pixel representative of an amount of detected light, wherein the stack of layers is arranged on the substrate with the photo-sensitive element arranged between the substrate and the upper reflective element.

The stack of layers may be integrated on the substrate.

The light sensor comprising a substrate carrying read-out circuitry implies that signals representative of the amount of detected light may be directly transferred to the substrate arranged below the photo-sensitive element for read-out.

According to an embodiment, the lower reflective element is formed by a metal layer arranged on the substrate.

The lower reflective element may be formed by a top metal layer (a back-end-of-line layer) of the substrate carrying the read-out circuitry. The metal layer may be reflective such that the top metal layer which is anyway available at a top surface of the substrate may further be used for forming the lower reflective element of the light sensor.

According to an embodiment, the metal layer is patterned to form separate reflective areas for different pixels.

Thus, each pixel may comprise a separate reflective area. This may facilitate that separate resonance structures are formed in the light sensor such that cross-talk between adjacent pixels is avoided or reduced.

The metal layer may further provide connection for the signals from the pixels to the read-out circuitry. The metal layer may therefore also need to be patterned in order to ensure that the signals from different pixels may be separately transferred to the read-out circuitry for reading out signals from the different pixels.

According to an embodiment, the upper reflective element is formed by multiple layers forming a distributed Bragg reflector.

Using a distributed Bragg reflector (DBR), the upper reflective element may be highly reflective. High reflectivity of the mirror also allows wavelength selectivity of a pixel to be very narrow, such that a narrow wavelength band is detected by the photo-sensitive elements of the pixels. Thus, a full width at half maximum (wavelength width at half maximum intensity of the detected light) may be very narrow, such as less than 30 nm.

Using a DBR, the reflectivity of the upper reflective element may be controlled based on a design of the DBR, such as number of layers, thickness of layers, and materials of layers in the DBR. The reflectivity of the upper reflective element may be configured to be matched to the reflectivity of the lower reflective element, which may typically be defined by reflectivity of the metal layer arranged on the substrate, for providing high sensitivity and/or spectral resolution of the light sensor.

According to an embodiment, the light sensor further comprises an electrical contact element in the stack of layers, wherein the electrical contact element is configured to form part of the upper reflective element or is configured to be arranged between the upper reflective element and the photo-sensitive element and which is configured to form electrical contact with the photo-sensitive element.

The light sensor may comprise a first and a second electrical contact element arranged on opposite sides of the photo-sensitive element in the stack of layers. The first and second electrical contact elements together with the photo-sensitive element may thus form a photodiode.

The electrical contact elements are configured to form electrical contact with the photo-sensitive element. However, this does not imply that the electrical contact elements need to be in direct contact with the photo-sensitive element. On the contrary, one or more layers or elements may be arranged between the photo-sensitive element and the respective electrical contact elements such that electrical contact is provided via an intermediate layer or element.

The photo-sensitive element may be configured to generate electrical charges in response to absorbing light. Thus, absorption of a photon may generate an electron-hole pair. Thanks to the photodiode being formed, generated electrons may be transported towards one of the first and the second electrical contact element and holes may be transported towards the other of the first and the second electrical contact element.

The electrical contact element arranged above the photo-sensitive element may form part of the upper reflective element. Thus, the upper reflective element may be formed by the electrical contact element and no separate reflective element may be needed. Compared to having a DBR, the electrical contact element may not be as highly reflective, and the electrical contact element may be used for forming the upper reflective element when a narrow selectivity of wavelength bands is not needed. In such case, the electrical contact element may be partially transparent and partially reflective to light of wavelengths of interest. The electrical contact element may in such case be implemented, for example, by an indium tin oxide (ITO) layer, by a thin metal layer, or by a stack of layers including ITO and a metal, such as an ITO/silver (Ag)/ITO stack.

The electrical contact element may be transparent in order to allow light to propagate through the electrical contact element towards the photo-sensitive element. This is used when the electrical contact element is arranged between the upper reflective element and the photo-sensitive element. The electrical contact element may thus be implemented, for example, by an ITO layer. ITO may be designed to be transparent to a broad range of wavelengths.

According to an embodiment, the light sensor further comprises a first transport layer and a second transport layer arranged on opposite sides of the photo-sensitive element in the stack of layers.

The transport layers are configured to transport charges generated by absorption of light away from the photo-sensitive element. The transport layers are configured to transport charges in a vertical direction through the stack of layers, i.e., transverse to a direction parallel to the planes of the layers.

The transport layers may be configured to transport charges of different signs, such that the first transport layer may be configured to transport electrons and the second transport layer may be configured to transport holes, or vice versa.

The transport layers may be patterned in order to provide separate areas of the transport layers for different pixels. However, the transport layers may have a conductivity which is not high enough to transport charges a sufficient distance such that charges may be transported from a pixel to an adjacent pixel. Thus, electrical crosstalk between pixels may be very small even if the transport layers are not patterned.

However, since arrangement of conductive structures of the spacer element may vary between different pixels, there may be non-uniformities in pixel performance. In order to avoid or reduce such non-uniformities, a transport layer in contact with the spacer element may be provided as a current-spreading layer which is configured to spread charges in a lateral direction, i.e., in a direction parallel to the plane of the layer. The current-spreading layer may alternatively be provided as a separate layer, which may be arranged between the transport layer and the spacer element.

The current-spreading layer may be implemented by an ITO layer, an indium gallium zinc oxide (IGZO) layer, an indium tin zinc oxide (ITZO) layer or a layer of another conductive metal oxide, or by a graphene layer. Since the current-spreading layer provides flow of charges in the lateral direction, the current-spreading layer should be patterned to avoid electrical crosstalk between adjacent pixels.

According to an embodiment, pixels are arranged in groups comprising a sub-set of pixels configured to detect different wavelengths of light, wherein the groups are repetitively arranged in the array of pixels such that the light sensor is configured to provide imaging with spatial and spectral resolution.

Thus, the light sensor may be configured to detect light in the array of pixels such that the detected light may be used for forming an image with spatial and spectral resolution. In this respect, the light sensor may form an image sensor.

According to a second aspect, there is provided a method for manufacturing a light sensor, said method comprising: forming a spacer element on a surface of a substrate carrying read-out circuitry, wherein the spacer element comprises at least two different materials distributed in a direction of a plane parallel to the surface of the substrate, wherein the spacer element forms a lower reflective element or is arranged on a layer of the substrate forming a lower reflective element; planarizing the spacer element to form a smooth top surface of the spacer element; forming a photo-sensitive element above the top surface of the spacer element; forming an upper reflective element above the photo-sensitive element; wherein the elements form a stack of layers with the elements arranged in mutually unique planes, parallel to each other, and wherein the stack of layers define a resonance structure between the upper reflective element and the lower reflective element for providing a resonance of light dependent on a wavelength of the light; wherein the spacer element comprises at least two different materials, wherein a distribution of the at least two different materials in a direction of a plane of the spacer element is different between different pixels in an array of pixels of the light sensor such that a resonance wavelength is different for different pixels; and wherein the spacer element is config- ured to enable flow of charges from the photo-sensitive element through the spacer element.

Effects and features of this second aspect are largely analogous to those described above in connection with the first aspect. Embodiments mentioned in relation to the second aspect are largely compatible with the first aspect.

A resonance structure is defined between the upper reflective element and the lower reflective element and a photo-sensitive element is formed between the upper reflective element and the lower reflective element. This implies that the spacer element which may be used for controlling the resonance wavelength of the resonance structure may be formed before the photo-sensitive element is formed.

Thus, the method comprises forming the spacer element before forming the photo-sensitive element. The spacer element may comprise small structures, such as sub-wavelength structures, for forming the distribution of the at least two different materials in the spacer element. Thus, forming of the spacer element may involve lithography and etching in order to define the small structures of the spacer element.

Thanks to the spacer element being formed before the photo-sensitive element, manufacturing steps for forming of the spacer element do not affect the photo-sensitive element. This implies that material and arrangement of the photo-sensitive element may be more freely selected since the photo-sensitive element need not withstand later patterning steps for forming the spacer element.

Thus, the manufacturing method allows for the photo-sensitive element to be formed using thin-film technology and allows freely selecting materials of the photo-sensitive element such that the light sensor may be manufactured to be sensitive to wavelengths of light from a vast range of wavelengths. For instance, the photo-sensitive element may be configured to detect light in the infrared range, such as SWIR or MWIR light.

As used herein, forming an element above another element should not be construed as the element being necessarily formed directly above the other element. Rather, there may be further intermediate elements in-between.

BRIEF DESCRIPTION OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
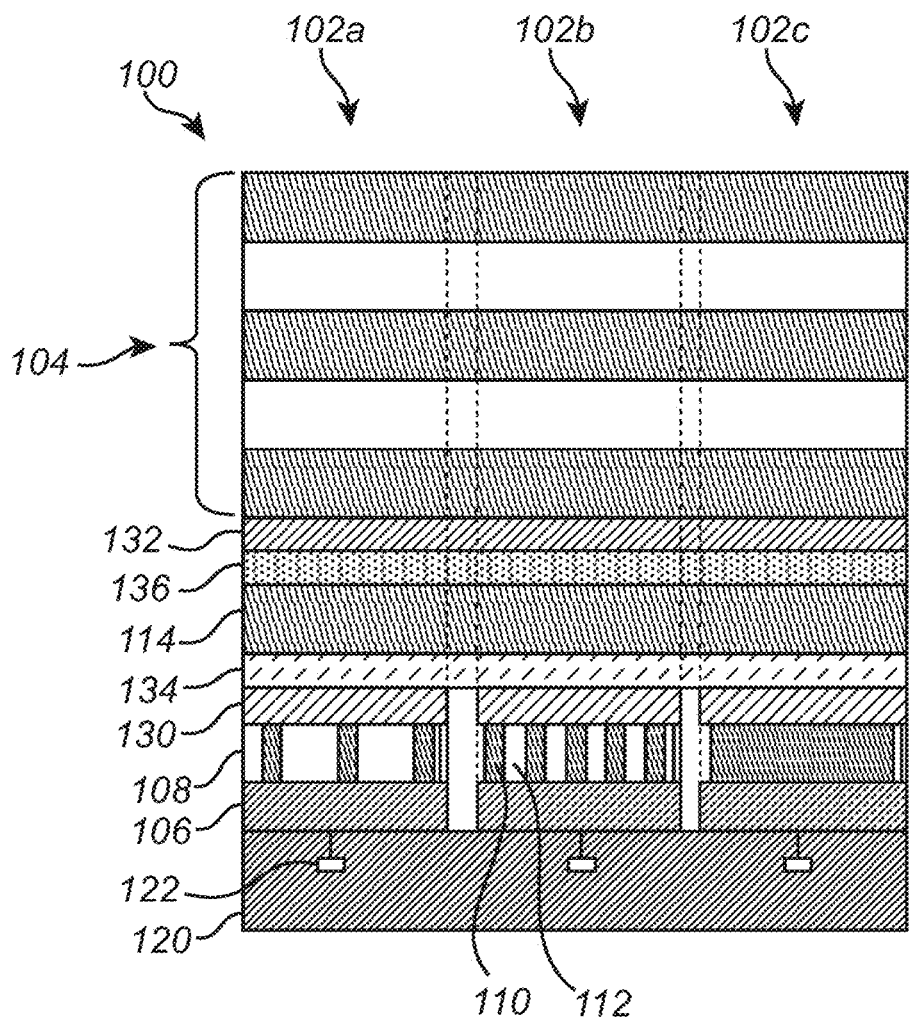
FIG. 1 is a schematic view of a cross-section of a light sensor according to an embodiment.

Referring now to FIG. 1, a light sensor 100 according to an embodiment will be discussed. The light sensor 100 is configured to provide detection of light with a spectral resolution.

The light sensor 100 comprises resonance structures 102*a*, 102*b*, 102*c*, which are configured with different resonance wavelengths, such that light of different wavelengths will be detected using the different resonance structures 102a, 102b, 102c.

A resonance structure 102a, 102b, 102c is formed by an upper reflective element 104 and a lower reflective element 106. The upper reflective element 104 and the lower reflective element 106 provide reflection of light back and forth between the reflective elements 104, 106, such that resonance may be created for light having a wavelength corresponding to an integer number of twice the optical path length between the upper reflective element 104 and the lower reflective element 106.

Each of the resonance structures 102a, 102b, 102c may form a Fabry-Pérot filter that is selective to a resonance wavelength in dependence of the optical path length formed by layers of material arranged between the upper reflective element 104 and the lower reflective element 106.

The light sensor 100 may be configured to receive light to be detected through the upper reflective element 104, such that light to be detected may enter the resonance structure 102a, 102b, 102c through the upper reflective element 104.

The upper reflective element 104 and the lower reflective element 106 may be reflective over a broad range of wavelengths. Thus, the upper reflective element 104 and the lower reflective element 106 may be reflective for each of the resonance wavelengths of the resonance structures 102a, 102b, 102c. This implies that the upper reflective element 104 and the lower reflective element 106 may be identical for all of the resonance structures 102a, 102b, 102c.

The light sensor 100 comprises a spacer element 108. As shown in FIG. 1, the spacer element 108 may be arranged within the resonance structure 102a, 102b, 102c between the upper reflective element 104 and the lower reflective element 106.

The spacer element 108 may be patterned such that the spacer element 108 may be different for different resonance structures 102a, 102b, 102c.

The resonance wavelength A of a resonance structure 102a, 102b, 102c may be defined as:

$$k\lambda = 2 nL \cos \Theta,$$

where k is an integer number, n is a refractive index of a material between the upper reflective element 104 and the lower reflective element 106, L is a distance (thickness) through the material, and Θ is an angle of incidence of light on the resonance structure 102a, 102b, 102c.

When the resonance structure 102a, 102b, 102c comprises several layers of different materials between the upper reflective element 104 and the lower reflective element 106, a total optical path length is a sum of the optical path length through individual layers.

The spacer element 108 may be configured to affect the resonance wavelength such that the resonance wavelength of the resonance structure 102a, 102b, 102c may depend on characteristics of the spacer element 108. The spacer element 108 comprises at least two different materials illustrated in FIG. 1 as a first material 110, and a second material 112. A distribution of the first material 110 and the second material 112 may be varied between different resonance structures 102a, 102b, 102c in order to control the resonance wavelength of the resonance structure 102a, 102b, 102c.

The distribution of the first material 110 and the second material 112 in the spacer element 108 may affect an effective refractive index of the spacer element 108, e.g., in dependence of density of each of the first material 110 and the second material 112 in a part of the spacer element 108 corresponding to the resonance structure 102a, 102b, 102c.

Thus, by changing the distribution of the first material 110 and the second material 112, the optical path length between the upper reflective element 104 and the lower reflective element 106 may be changed such that the resonance wavelength is changed.

The first material 110 and the second material 112 may thus have different refractive indices in order for the change of distribution of the first material 110 and the second material 112 to affect the optical path length. For instance, the first material 110 may be amorphous silicon and the second material 112 may be silicon dioxide. These materials may be used for varying a refractive index of the spacer element in the range of 1.6-3.2.

At least one of the first material 110 and the second material 112 of the spacer element 108 may be a metal. This may imply that the resonance wavelength of the resonance structures 102a, 102b, 102c is changed based on a plasmonic effect instead of a change in refractive index of the spacer material 108. The distribution of the first material 110 and the second material 112 may be varied between different resonance structures 102a, 102b, 102c so as to vary the plasmonic effect and the change the resonance wavelength.

The resonance structures 102a, 102b, 102c may thus have different resonance wavelengths. The resonance structures 102a, 102b, 102c may be configured to select a narrow wavelength band forming the resonance wavelength within a broad wavelength range, in which the upper reflective element 104 and the lower reflective element 106 are reflective.

The spacer element 108 may at least for some of the resonance structures 102a, 102b, 102c be configured to form a metamaterial. The spacer element 108 may comprise geometrical structures such that a size of a geometrical structure and/or a distance between the geometrical structures is smaller than the resonance wavelength of the resonance structures. The small geometrical structures may thus be configured to affect interaction between the spacer element 108 and light, so as to for instance control the effective refractive index of the spacer element 108 as described above. The structures of the spacer element 108 may be configured to extend through an entire thickness of the spacer element 108.

It should be realized that the spacer element 108 need not necessarily include both the first material 110 and the second material 112 for each resonance structure 102a, 102b, 102c. As shown in FIG. 1, the spacer element 108 may comprise only the first material 110 in the resonance structure 102c, whereas the spacer element 108 may comprise a combination of the first material 110 and the second material 112 in the other resonance structures 102a, 102b. Thus, for the resonance structure 102c, optical properties of the spacer element 108 is entirely controlled by the first material 110 and the spacer element 108 does not form a metamaterial in this resonance structure 102c. It should be realized that the distribution of the first material 110 and the second material 112 being different for different resonance structures 102a, 102b, 102c may thus include that the spacer material 108 only includes one of the materials in a resonance structure 102c. However, for at least some of the resonance structures 102a, 102b, the spacer element 108 includes both the first material 110 and the second material 112 with different distributions of the first material 110 and the second material 112 for different resonance structures 102a, 102b.

Instead of being arranged between the upper reflective element 104 and the lower reflective element 106, the spacer element 108 may alternatively form the lower reflective element. The spacer element 108 may thus be configured to be reflective to a broad wavelength range. The distribution of the first material 110 and the second material 112 may be configured to define an effective distance into the spacer element 108 at which reflection of light occurs, so as to effectively define the optical path length of the resonance structure 102a, 102b, 102c. The optical path length may thus be different for different resonance structures 102a, 102b, 102c in dependence of the distribution of the first material 110 and the second material 112.

Alternatively, where at least one of the first material 110 and the second material 112 of the spacer element 108 is a metal, the resonance wavelength may be changed based on a plasmonic effect. The distribution of the first material 110 and the second material 112 may be varied between different resonance structures 102a, 102b, 102c so as to vary the plasmonic effect and the change the resonance wavelength.

The light sensor 110 further comprises a photo-sensitive element 114. The photo-sensitive element 114 is arranged between the upper reflective element 104 and the lower reflective element 106. The photo-sensitive element 114 is configured to be sensitive over the range of wavelengths in which the wavelength bands of the resonance structures 102a, 102b, 102c are selected.

The photo-sensitive element 114 is configured to absorb light for detecting an amount of light. The photo-sensitive element 114 may however have a high transmittance of light such that a large proportion of light is transmitted through the photo-sensitive element 114 such that a strong resonance is formed between the upper reflective element 104 and the lower reflective element 106. Even with a relatively low absorbance of the photo-sensitive element 114, the photo-sensitive element 114 will still efficiently detect light incident on the resonance structure 102a, 102b, 102c, since light will propagate back and forth between the upper reflective element 104 and the lower reflective element 106 so as to pass the photo-sensitive element 114 multiple times.

For instance, an absorption coefficient α of the photo-sensitive element 114 may be in a range of α=1-25 000 cm$^{-1}$, such as α=100-5 000 cm$^{-1}$. A thickness of the photo-sensitive element 114 may be in a range of 50-1000 nm, such as in a range of 100-300 nm. If the absorption coefficient is relatively low, a thickness of the photo-sensitive element 114 may be relatively large, whereas if the absorption coefficient is relatively high, a thickness of the photo-sensitive element 114 may be relatively small. Thus, an overall absorbance of the photo-sensitive element 114 may be designed by selecting the absorption coefficient (based on material used) and thickness of the photo-sensitive element 114.

When a photon is absorbed by the photo-sensitive element 114, an electron-hole pair is generated. Generated charges may thus be measured in order to provide a measurement of the amount of detected light. Generated charges may be transported towards a read-out circuitry 122, which may be arranged on a substrate 120 on which the resonance structures 102a, 102b, 102c are formed.

The spacer element 108 may be configured to form the lower reflective element 106 or may be arranged between the lower reflective element 104 and the photo-sensitive element 114. This implies that charges generated by the photo-sensitive element 114 may need to be transported through the spacer element 108 towards the read-out circuitry 122.

The spacer element 108 may alternatively be arranged between the photo-sensitive element 114 and an electrical contact element which controls flow of charges away from the photo-sensitive element 114 such that charges in the photo-sensitive element 114 do not affect further detection of light by the photo-sensitive element 114. The photo-sensitive element 114 may be arranged between two electrical contact elements on opposite sides of the photo-sensitive element 114. Thus, the spacer element 108 being arranged between the photo-sensitive element 114 and an electrical contact element may be arranged above the photo-sensitive element 114, i.e., on an opposite side of the photo-sensitive element 114 compared to the read-out circuitry 122.

The spacer element 108 may thus be configured to enable flow of charges from the photo-sensitive element 114 through the spacer element 114. At least one of the first material 110 and the second material 112 may be configured to allow flow of charges through the spacer element 108. Thus, a material may be used in the spacer element 108 both for providing control of the resonance wavelength of the resonance structure 102a, 102b, 102c and for providing flow of charges through the spacer element 114.

The first material 110 of the spacer element 108 may be a semiconductor, which may provide conduction of charges through the spacer element 108. For instance, the first material 110 may be amorphous silicon.

The second material 112 of the spacer element 108 may be a dielectric material such that the second material 112 does not contribute to the flow of charges through the spacer element 108. According to an alternative, the second material 112 of the spacer element 108 may also be a semiconductor such that both the first material 110 and the second material 112 may contribute to the flow of charges through the spacer element 108.

The first material 110 of the spacer element 108 may be a metal, such as copper. This implies that a high conductivity of charges is provided through the spacer element 108. Thus, efficient transport of charges through the spacer element 108 may be provided, which may avoid or reduce electrical variation in conduction of charges between different resonance structures 102a, 102b, 102c. Such electrical variation may otherwise affect a signal representative of detected light read out from the resonance structure 102a, 102b, 102c.

Where the first material 110 of the spacer element 108 is a metal, the second material 112 of the spacer element 108 may be a dielectric material, such as silicon dioxide, such that the second material 112 does not contribute to the flow of charges through the spacer element 108. According to an alternative, the second material 112 of the spacer element 108 may be a semiconductor such that the second material 112 may contribute to the flow of charges through the spacer element 108.

According to another alternative, both the first material 110 and the second material 112 of the spacer element 108 may be metals. In such case, the spacer element 108 will be reflective, such that the spacer element 108 forms the lower reflective element 106. However, it should be realized that the spacer element 108 may form the lower reflective element 106 even if the first material 110 or the second material 112 is not a metal.

According to yet another alternative, both the first material 110 and the second material 112 of the spacer element 108 may be dielectric materials. In such case, neither the first material 110 nor the second material 112 of the spacer element 108 contributes to enabling a flow of charges through the spacer element 108. The spacer element 108 may then comprise a third material, which is arranged to extend through the spacer element 108 in each of the resonance structures 102a, 102b, 102c. The third material may be electrically conductive, such as being a metal or a semiconductor. The third material may be arranged in a common manner in each of the resonance structures 102*a*, 102*b*, 102*c* such that conductivity of charges through the spacer element 108 is equal for all of the resonance structures 102*a*, 102*b*, 102*c*.

According to yet another alternative, the spacer element 108 may be arranged between the photo-sensitive element 114 and the upper reflective element 104 such that no flow of charges through the spacer element 108 is necessary. Hence, the spacer element 108 may be arranged between an electrical contact element and the upper reflective element 104. In such case, both the first material 110 and the second material 112 of the spacer element 108 may be dielectric materials. However, the spacer element 108 may still provide flow of charges through the spacer element 108 even though the flow of charges does not contribute to electrical function of the light sensor 100.

The lower reflective element 106, the spacer element 108, the photo-sensitive element 114 and the upper reflective element 108 may form a stack of layers, wherein each element is formed by one or more layers having a large extension in a plane and a small thickness transverse to the plane. The layers are arranged with the planes stacked on each other such that the planes are mutually unique and parallel to each other.

The stack of layers may be formed on a substrate 120 carrying the read-out circuitry 122 such that the planes of the layers are arranged parallel to a surface of the substrate 120 with the lower reflective element 106 being arranged closest to the substrate 120.

The lower reflective element 106 may be patterned in the plane such that separate areas of the lower reflective element 106 may be formed and are separated in a direction parallel to the planes of the stack. The separate areas of the lower reflective element 106 may define separate resonance structures 102*a*, 102*b*, 102*c* through the stack of layers, where the resonance structures 102*a*, 102*b*, 102*c* are also separated in a direction parallel to the planes of the stack.

The spacer element 108 may also be patterned in that the spacer element 108 comprises different distributions of the first material 110 and the second material 112 in a direction parallel to the plane of the spacer element 108. The distributions of the first material 110 and the second material 112 is aligned with the separate areas of the lower reflective element 106 such that arrangement of the spacer element 108 for controlling the resonance wavelength is aligned with the respective resonance structure 102*a*, 102*b*, 102*c*.

The substrate 120 carrying read-out circuitry 122 may be manufactured in a semiconductor fabrication plant using conventional semiconductor processing steps. The substrate 120 may be provided with back end of line (BEOL) metal layers in order to interconnect components, such as transistors, formed on the substrate, so as to define the read-out circuitry 122 and also provide access to the read-out circuitry 122. The BEOL metal layers are arranged above the components on the substrate 120.

A topmost BEOL metal layer may be used for forming the lower reflective element 106. The BEOL layer is anyway formed by metal, which is highly reflective. The metal of the BEOL layer may thus be patterned to define separate areas for the resonance structures 102*a*, 102*b*, 102*c*.

Each of the separate areas of the BEOL layer may be connected to separate parts of the read-out circuitry 122 such that signals from each of the resonance structures 102*a*, 102*b*, 102*c* may be separately read out.

The spacer element 108 comprises small structures for forming the desired distribution of the first material 110 and the second material 112, such as forming a metamaterial. Thus, the forming of the spacer element 108 may involve high precision patterning steps, such as lithography, and the spacer element 108 may advantageously be formed on the BEOL metal layer in the semiconductor fabrication plant.

The photo-sensitive element 114 and layers arranged above the photo-sensitive element 114 (i.e., on an opposite side of the photo-sensitive element 114 than the spacer element 108) need not include small structures and thus need not involve high precision lithography steps in manufacturing. Rather, these layers may be formed by thin-film deposition, such as using spin coating.

The photo-sensitive element 114 and the upper reflective element 104 may be formed by continuous layers, which may extend continuously over the resonance structures 102*a*, 102*b*, 102*c*. The resonance structures 102*a*, 102*b*, 102*c* may still be accurately defined by the lower reflective element 106 and the spacer element 108.

Availability of thin-film deposition for manufacturing of the photo-sensitive element 114 allows many different materials to be used in the photo-sensitive element 114. The photo-sensitive element 114 need not be configured to withstand later steps for patterning structures above the photo-sensitive element 114.

The photo-sensitive element 114 may for example include colloidal quantum dots, such as PbS, PbSe, InAs, InAsSb, HgTe. In other embodiments, the photo-sensitive element 114 may include an organic material, a perovskite material, or a semiconductor material. Such materials, in particular colloidal quantum dots, may be particularly sensitive to later steps involving high precision patterning.

Availability of many different materials to be used in the photo-sensitive element 114 also allows the photo-sensitive element 114 to be sensitive to wavelengths extending outside visible light. Thus, although the light sensor 100 may be configured to detect visible light, the light sensor 100 may in other embodiments be configured to detect infrared light, such as SWIR light or MWIR light.

Thanks to the spacer element 108 being arranged below the photo-sensitive element 114 (closer to the substrate 120), high precision patterning steps need not be performed after the photo-sensitive element 114 is formed. Further, thanks to the spacer element 108 being configured to enable flow of charges from the photo-sensitive element 114, signals representative of the amount of detected light may still be transferred from the photo-sensitive element 114 for read out.

However, as mentioned above, the spacer element 108 may in some embodiments be arranged above the photo-sensitive element 114. In such case, the spacer element 108 may need to be carefully formed in order not to damage the photo-sensitive element 114. Alternatively, the photo-sensitive element 114 may be formed in another way, such as using bulk semiconductor technology. Thus, the photo-sensitive element 114 may not be as sensitive to later steps of forming the spacer element 108. According to another alternative, the spacer element 108 may be formed on a separate, temporary substrate and may be transferred from the temporary substrate to be arranged above the photo-sensitive element 114 so as to avoid patterning of the spacer element 108 on the photo-sensitive element 114.

A thickness of the spacer element 108 may be in a range of 50-500 nm, and more preferably in a range of 100-300 nm. If the spacer element 108 is relatively thick, there is a higher degree of freedom in controlling the resonance wavelength of the resonance structures 102*a*, 102*b*, 102*c*. However, if the spacer element 108 is too thick, flow of charges through the spacer element 108 may not be sufficiently efficient. If a metal is used for providing flow of charges through the spacer element 108, the spacer element 108 may be allowed to be thicker compared to if a semiconductor material is used for providing flow of charges, since the metal provides a high electrical conductivity.

As mentioned above, the photo-sensitive element 114 may be configured to generate charges in response to absorbing light. Thus, electron-hole pairs may be generated.

The stack of layers may further include electrical contact elements 130, 132 on opposite sides of the photo-sensitive element 114. Thus, a first electrical contact element 130 may be arranged between the lower reflective element 106 and the photo-sensitive element 114 and a second electrical contact element 132 may be arranged between the upper reflective element 104 and the photo-sensitive element 114.

Each of the electrical contact elements 130, 132 may be in electrical contact with the photo-sensitive element 114. The electrical contact elements 130, 132 may define potentials on opposite sides of the photo-sensitive element 114 for driving charges generated by absorbance of light from the photo-sensitive element 114 towards the electrical contact elements 130, 132. Potential may be set such that electrons are driven in one direction and holes are driven in the opposite direction.

The stack of layers may further include transport layers 134, 136 on opposite sides of the photo-sensitive element 114. The transport layers 134, 136 may be in direct contact with the photo-sensitive element 114. The transport layers 134, 136 may be configured to transport charges of different types, such that a first transport layer 134 may be an electron transport layer and a second transport layer 136 may be a hole transport layer. Thus, the electron transport layer 134 may be arranged between the lower reflective element 106 and the photo-sensitive element 114, whereas the hole transport layer 136 may be arranged between the upper reflective layer 104 and the photo-sensitive element 114. However, it should be realized that the electron transport layer and the hole transport layer may alternatively be arranged with the hole transport layer below the photo-sensitive element 114 and the electron transport layer above the photo-sensitive element 114.

The transport layers 134, 136 may be configured to efficiently transport charges away from the photo-sensitive element 114. This implies that charges may be quickly transported away from the photo-sensitive element 114 such that charges in the photo-sensitive element 114 do not affect further detection of light by the photo-sensitive element 114. Thus, the transport layers 134, 136 may contribute to performance of light detection of the light sensor 100 and reduce noise.

The transport layers 134, 136 may be configured to mainly transport charges through the transport layers 134, 136. Thus, charges may be transported by the transport layers 134, 136 in a direction transverse to the planes of the transport layers 134, 136. This implies that the transport layers 134, 136 will not provide transport of charges in a direction parallel to the planes of the transport layers 134, 136 such that the transport layers 134, 136 may be arranged to extend continuously in the layers 134, 136 extending across the resonance structures 102a, 102b, 102c without crosstalk occurring between the resonance structures 102a, 102b, 102c.

The first electrical contact element 130 need not necessarily be arranged between the lower reflective element 106 and the photo-sensitive element 114. Instead, the topmost metal layer on the substrate 120 may form both the lower reflective element 106 and the first electrical contact element 130.

Also, the second electrical contact element 132 need not necessarily be arranged between the upper reflective element 104 and the photo-sensitive element 114. Instead, the second electrical contact element 132 may also form the upper reflective element 104.

The first electrical contact element 130 and the second electrical contact element 132 may be configured to control functionality of the resonance structures 102a, 102b, 102c. Thus, the first electrical contact element 130 and the second electrical contact element 132 may, for instance, apply an electrical bias to the photo-sensitive elements 114, control signal read-out, control reset of signals, etc.

The first electrical contact element 130 may be patterned such that separate areas are formed for each of the resonance structures 102a, 102b, 102c. The second electrical contact element 132 may be arranged to extend continuously across the resonance structures 102a, 102b, 102c.

The first electrical contact element 130 and the second electrical contact element 132 may thus be arranged within the resonance structures 102a, 102b, 102c between the upper reflective element 104 and the lower reflective element 106. Thus, the first electrical contact element 130 and the second electrical contact element 132 may be formed from a transparent material, such as indium tin oxide (ITO).

However, if the first electrical contact element 130 and/or the second electrical contact element 132 form part of the lower reflective element 106 and the upper reflective element 104, respectively, layer(s) of an at least partly reflective material may be used. The first electrical contact element 130 may be formed by the topmost metal layer on the substrate 120. The second electrical contact element 132 may for instance be formed by a partly reflective ITO, by a thin metal layer, by a stack of layers including ITO and a metal, such as an ITO/silver (Ag)/ITO stack, or by a stack comprising nano-sheet, such as graphene, graphene oxide, or metal nanowires.

The spacer element 108 may have different distribution of the first material 110 and the second material 112 between different resonance structures 102a, 102b, 102c. If the first material 110 and/or the second material 112 is used for enabling flow of charges through the spacer element 108, non-uniformities in conduction of charges from the photo-sensitive element 114 may be observed between resonance structures 102a, 102b, 102c. In order to reduce non-uniformities, a current-spreading layer may be used. The current-spreading layer may be arranged between the first transport layer 134 and the spacer element 108, or the current-spreading layer may form the first transport layer 134.

The current-spreading layer may be configured to spread charges in a direction parallel to the plane of the current-spreading layer to ensure that charges can be effectively collected and transported through the spacer element 108, regardless of the distribution of the first material 110 and the second material 112 in the spacer element 108.

The current-spreading layer may be patterned such that separate areas of the current-spreading layer are formed for different resonance structures 102a, 102b, 102c so as to avoid crosstalk between the resonance structures 102a, 102b, 102c.

The current-spreading layer may comprise a semiconductor, such as amorphous silicon, a transparent oxide, such as ITO, indium gallium zinc oxide or indium tin zinc oxide, and/or a nanosheet, such as graphene, graphene oxide, or metal nanowires.

The upper reflective element 104 may be formed by multiple layers forming a distributed Bragg reflector (DBR). A DBR may provide a high reflectivity with low optical losses.

The use of a DBR as the upper reflective element 104 (instead of the second electrical contact element 132 being reflective) may ensure that a high reflectivity is provided. This implies that the resonance structures 102a, 102b, 102c may be configured to define very narrow wavelength bands for which light is detected by the photo-sensitive element 114.

Each resonance structure 102a, 102b, 102c may enable read-out of a separate signal representative of an amount of detected light by the photo-sensitive element 114 in the respective resonance structure 102a, 102b, 102c. As such, one resonance structure 102a, 102b, 102c may be seen as corresponding to one pixel in an array of pixels, in that the resonance structure 102a, 102b, 102c provides separate information content.

Information of the amount of detected light may be read out by the read-out circuitry 122 such that separate signals may be read out for the different resonance structures 102a, 102b, 102c (pixels). However, it should be understood that the information from each pixel need not necessarily be separately represented when information is further processed by the read-out circuitry 122 or by further processing of the detected light.

The array of pixels may be configured to detect light of a plurality of different wavelengths. Thus, the light sensor may be used for detecting spectral information, which may for instance be used for analysis of chemical substances.

The array of pixels may be configured to be one-dimensional. This may be used when spectral information is to be detected but no spatial information is detected.

The array of pixels may be configured to be two-dimensional. This may be used when spectral information is to be detected together with spatial information. In such case, the pixels may be arranged in groups comprising a sub-set of pixels configured to detect different wavelengths of light, wherein the groups are repetitively arranged in the array of pixels such that the light sensor 100 is configured to provide imaging with spatial and spectral resolution. The light sensor 100 may thus form an image sensor.

Figure 2:
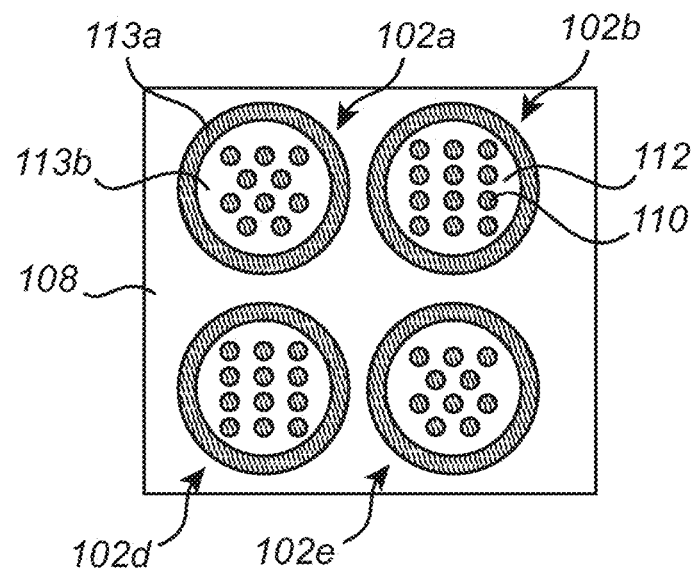
FIG. 2 is a schematic top view of a spacer element of the light sensor according to an embodiment.

Referring now to FIG. 2, an embodiment for providing distribution of the first material 110 and the second material 112 is discussed. FIG. 2 is a top view of the spacer element 108 for a plurality of resonance structures 102a, 102b, 102d, 102e.

The spacer element 108 may comprise a first region 113a and a second region 114a associated with each resonance structure 102a, 102b, 102d, 102e. The first region 113a and the second region 113b may be arranged in areas which are defined in a common manner for all resonance structures 102a, 102b, 102d, 102e.

The first region 113a may be completely filled by the first material 110, which may provide flow of charges through the spacer element 108. For example, as shown in FIG. 2, the first region 113a may surround the second region 113b, e.g., forming a ring around the second region 113b. This implies that electric field is evenly distributed for the resonance structures 102a, 102b, 102d, 102e in the plane of the spacer element 108, which ensures efficient charge collection by the spacer element 108.

According to an alternative, a plurality of vias may be arranged in a fixed pattern in the first region 113a, wherein the vias are filled by the first material 110 for providing flow of charges through the spacer element 108.

The distribution of the first material 110 and the second material 112 in the second region 113b may then control the resonance wavelength of the resonance structure 102a, 102b, 102d, 102e such that the distribution of the first material 110 and the second material 112 in the second region 113b may be different for different resonance structures 102a, 102b, 102d, 102e.

It should be further realized that, if a third material of the spacer element 108 is used, the third material may be provided in the first region 113a. Thus, the third material may enable flow of charges through the spacer element 108 in a common manner for all resonance structures 102a, 102b, 102d, 102e.

The first material 110 and the second material 112 may then be arranged in the second region 113b with different distributions of the first material 110 and the second material 112 in order to control the resonance wavelength of the resonance structures 102a, 102b, 102d, 102e.

Figure 3:
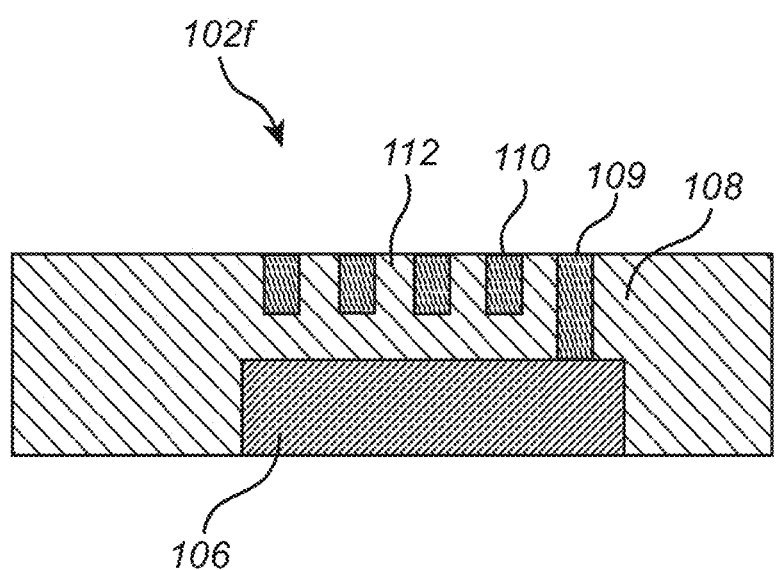
FIG. 3 is a schematic cross-sectional view of a spacer element of the light sensor according to an embodiment.

Referring now to FIG. 3, another embodiment for providing distribution of the first material 110 and the second material 112 is discussed. FIG. 3 is a top view of the spacer element 108 for a resonance structure 102f.

As indicated in FIG. 3, structures of the first material 110 need not extend through the entire spacer element 108. Thus, height of the structures of the first material 110 may be varied, which may be used as a further parameter for controlling resonance wavelength of the resonance structure 102f.

It should be realized that structures of the first material 110 and/or the second material 112 need not extend through the entire spacer element 108 and may be varied in height.

As further illustrated in FIG. 3, a structure 109 is extending through the entire thickness of the spacer element 108 for providing flow of charges through the spacer element 108. For instance, a structure in the first region 113a of the spacer element 108 may extend through the entire thickness of the spacer element 108, whereas structures in the second region 113b of the spacer element 108 may be provided with variable height.

Thus, the embodiment in FIG. 3 for providing variable height of structures may be advantageously combined with the embodiment in FIG. 2, where a first region 113a and a second region 113b is defined for the spacer element 108 in each resonance structure.

Figure 4:
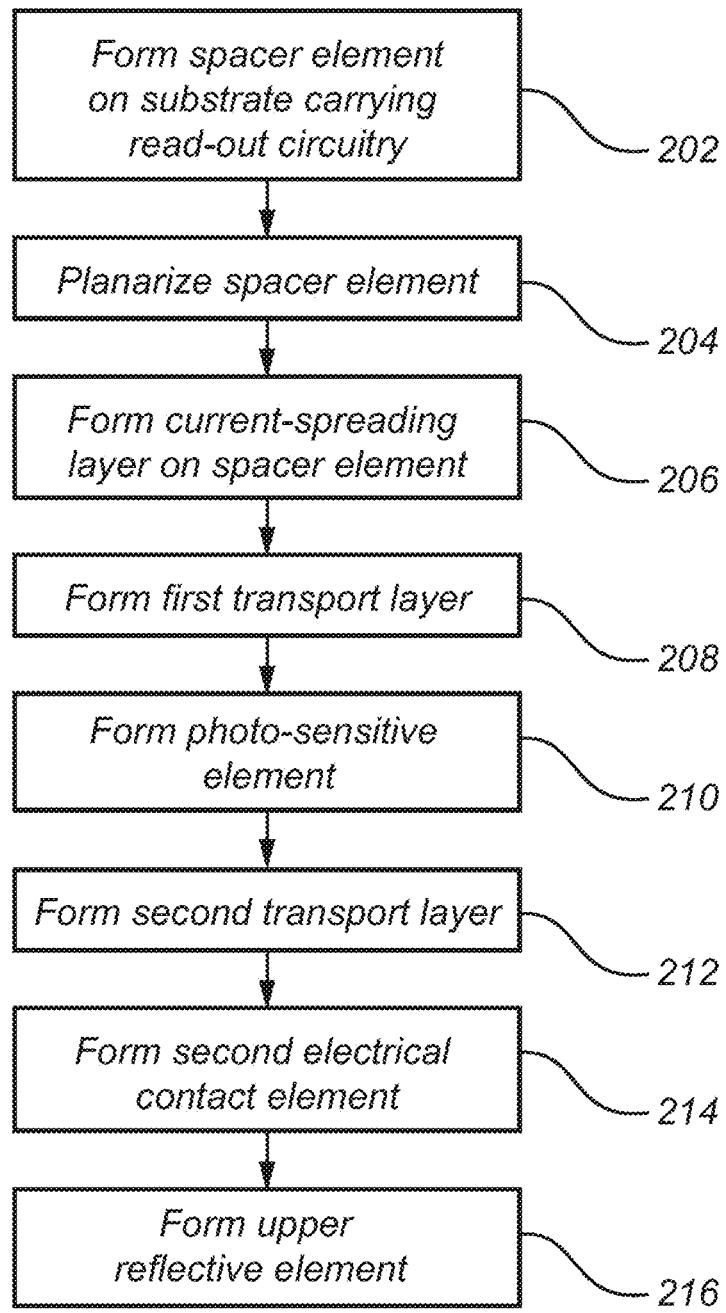
FIG. 4 is a flow chart of a method according to an embodiment.

Referring now to FIG. 4, a method for manufacturing a light sensor 100 where the spacer element 108 is arranged below the photo-sensitive element 114 will be described.

The light sensor 100 may be manufactured on a substrate 120 carrying read-out circuitry 122. The substrate 120 carrying read-out circuitry 122 may comprise an integrated circuit which is manufactured on a substrate using semiconductor manufacturing technology. This may involve forming components of the read-out circuitry 122 in complementary metal-oxide-semiconductor (CMOS) technology. The components may then be connected by BEOL metal layers formed on the components.

A topmost BEOL layer may be patterned on the substrate 120 so as to define electrodes which may be used for receiving a signal for a pixel of the light sensor 100, which may further be read by the read-out circuitry. Thus, the topmost BEOL layer may be patterned with separate areas, wherein each area is associated with a pixel of the light sensor 100. The patterning of the topmost BEOL layer may be provided by conventional semiconductor fabrication technology.

The topmost BEOL layer comprises a metal and is hence reflective to light. Thus, the topmost BEOL layer may form a lower reflective element of the light sensor 100, wherein each separate area of the BEOL layer forms a lower reflective element for an individual pixel of the light sensor 100.

The method comprises forming 202 a spacer element 108 on a surface of the substrate 120. The spacer element 108 forms a layer arranged on the surface of the substrate 120 and parallel therewith. The spacer element 108 is configured to be arranged in contact with the topmost BEOL layer on the substrate 120.

The spacer element 108 according to any of the embodiments discussed above may be formed. Thus, the spacer element 108 comprises at least two different materials 110, 112, which are distributed in a direction of a plane parallel to the surface of the substrate 120. The distribution of the at least two different materials 110, 112 may control a resonance wavelength of pixels of the light sensor 100, such that the spacer element 108 has different distributions of the at least two different materials 110, 112 for different pixels so as to define different resonance wavelengths.

The spacer element 108 may be configured to be aligned with the patterned topmost BEOL layer such that the distribution of the materials 110, 112 for a particular pixel is associated with the corresponding separate area of the topmost BEOL layer.

The spacer element 108 is further configured to enable flow of charges through the spacer element 108 according to any of the embodiments described above. The spacer element 108 may thus allow charges to flow through the spacer element 108 to reach the electrode of the topmost BEOL layer.

The spacer element 108 may form the lower reflective element 106 of the pixels of the light sensor 100. Alternatively, a layer on the substrate 120, such as the topmost BEOL layer may form the lower reflective element 106 such that the spacer element 108 is arranged on the lower reflective element 106.

The forming of the spacer element 108 involves defining small structures in the spacer element 108. The spacer element 108 may form a metamaterial having geometric structures and/or distances between geometric structures that are smaller than a wavelength to be detected by the light sensor 100, such as smaller than 1 μm when infrared light is to be detected.

The forming of the spacer element 108 may thus involve steps for defining very small structures, such as using lithography, etching, and several steps of depositing material. The forming of the spacer element 108 may advantageously be performed at a semiconductor fabrication plant, at which the substrate 120 has also been produced. Equipment required for defining the small structures of the spacer element 108 are readily available at the semiconductor fabrication plant.

The method further comprises planarizing 204 the spacer element 108. A smooth top surface of the spacer element 108 may thus be formed after the patterning steps for defining structures of the spacer element 108 have been performed. Thus, the spacer element 108 may provide a flat top surface, which facilitates forming of layers above the spacer element 108.

The planarizing of the spacer element 108 may for instance be achieved by chemical mechanical polishing (CMP).

The method may further comprise forming 206 a current-spreading layer on the spacer element 108. The current-spreading layer may be optionally used. The current-spreading layer may form a layer arranged on the surface of the spacer element 108 and parallel therewith.

The current-spreading layer may provide spreading of charges along a direction parallel to a plane of the current-spreading layer. The current-spreading layer may thus ensure that charges can be effectively collected and transported through the spacer element 108, regardless of the distribution of the at least two materials 110, 112 in the spacer element 108.

The current-spreading layer may be patterned such that separate areas of the current-spreading layer are formed for different pixels of the light sensor 100. The separate areas of the current-spreading layer may be configured to be aligned with the distribution of the materials 110, 112 of the spacer element 108 for a particular pixel.

The current-spreading layer may not involve as small structures as the spacer element 108. Nevertheless, forming of the current-spreading layer may involve patterning steps, such as using lithography and etching, which may be provided by equipment readily available at the semiconductor fabrication plant.

The current-spreading layer may further be planarized to provide a smooth, flat top surface on which further layers are formed.

The method may further comprise forming a first electrical contact element 130. The first electrical contact element 130 may provide electrical contact with a photo-sensitive element 114 of the light sensor 100 and may control a photodiode in which light is detected.

The topmost BEOL layer may form the first electrical contact element 130. However, according to an alternative, the first electrical contact element 130 is formed in a separate layer. The first electrical contact element 130 may be formed on the spacer element 108, possibly between the spacer element 108 and the current-spreading layer if a current-spreading layer is present. The first electrical contact element may form a layer arranged on the surface of the spacer element 108 and parallel therewith.

The first electrical contact element 130 may be patterned such that separate areas of the first electrical contact element 130 are formed for different pixels of the light sensor 100. The separate areas of the first electrical contact element 130 may be configured to be aligned with the distribution of the materials 110, 112 of the spacer element 108 for a particular pixel.

The first electrical contact element 130 may not involve as small structures as the spacer element 108. Nevertheless, forming of the first electrical contact element 130 may involve patterning steps, such as using lithography and etching, which may be provided by equipment readily available at the semiconductor fabrication plant.

The first electrical contact element 130 may further be planarized to provide a smooth, flat top surface on which further layers are formed.

The method may further comprise forming 208 a first transport layer 134 above the spacer element 108, such as on the first electrical contact element 130 or on the current-spreading layer. The first transport layer 134 is configured to transport a particular type of charges, such as electrons. The first transport layer 134 may thus be formed by a suitable material.

According to an alternative, the current-spreading layer may also form the first transport layer 134 such that no separate first transport layer 134 may be needed.

However, where the first transport layer 134 is separate from the current-spreading layer or where no current-spreading layer is used, the first transport layer 134 may be formed as a continuous layer extending over an entire area in which the light sensor 100 is to be formed. The first transport layer 134 may form a layer arranged on the surface of the spacer element 108 and parallel therewith.

The first transport layer 134 may be configured to mainly transport charges in a direction transverse through a plane of the first transport layer 134. Thus, there may be no need in patterning of the first transport layer 134 in order to avoid crosstalk between pixels.

Thus, the first transport layer 134 may be formed by thin-film deposition. This may provide a possibility to use materials which do not need to be adapted for use with semiconductor processing steps.

All following steps of producing layers may be provided by thin-film deposition, such that a semiconductor fabrication plant need not be used for the forming of the first transport layer 134 and the following steps. However, it should be realized that other manners of depositing material to form the layers may be used.

The method further comprises forming 210 a photo-sensitive element 114 above the spacer element 108. The photo-sensitive element 114 may for instance be formed directly on the spacer element 108 or may be formed on the first transport layer 134 if the first transport layer 134 is present.

The photo-sensitive element 114 is configured to absorb light and generate electron-hole pairs in response to light being absorbed. The first transport layer 134 may thus be formed by a suitable material in dependence of wavelengths of light to be detected. For instance, the photo-sensitive element 114 may include colloidal quantum dots.

The photo-sensitive element 114 may be formed as a continuous layer extending over an entire area in which the light sensor 100 is to be formed. The photo-sensitive element 114 may form a layer arranged on the surface of the spacer element 108 and parallel therewith.

For instance, the photo-sensitive element 114 may be formed by thin-film deposition. This may provide a possibility to use materials which do not need to be adapted for use with semiconductor processing steps.

The method may further comprise forming 212 a second transport layer 136 on the photo-sensitive element 114. The second transport layer 136 is configured to transport a particular type of charges having an opposite sign to the charges transported by the first transport layer 134. For instance, the second transport layer 136 may be configured to transport holes. The second transport layer 136 may thus be formed by a suitable material.

The second transport layer 136 may be formed as a continuous layer extending over an entire area in which the light sensor 100 is to be formed. The second transport layer 136 may form a layer arranged on the surface of the photo-sensitive element 114 and parallel therewith.

The second transport layer 136 may be configured to mainly transport charges in a direction transverse through a plane of the second transport layer 136. Thus, there may be no need in patterning of the second transport layer 136 in order to avoid crosstalk between pixels.

Thus, the second transport layer 136 may be formed by thin-film deposition. This may provide a possibility to use materials which do not need to be adapted for use with semiconductor processing steps.

The method may further comprise forming 214 a second electrical contact element 132. The second electrical contact element 132 may provide electrical contact with the photo-sensitive element 114 and may together with the first electrical contact element 130 control a photodiode in which light is detected. Since the first electrical contact element 130 may be patterned, there may be no need for patterning of the second electrical contact element 132.

The second electrical contact element 132 may be formed as one or more continuous layers extending over an entire area in which the light sensor 100 is to be formed. The second electrical contact element 132 may form a layer arranged on the surface of the second transport layer 136 or on the surface of the photo-sensitive element 114 and parallel therewith.

The second electrical contact element 132 may be formed by thin-film deposition.

The method further comprises forming 216 an upper reflective element 104 above the photo-sensitive element 114, such as forming the upper reflective element 104 on the second electrical contact element 132. However, according to an alternative, the upper reflective element 104 may also form the second electrical contact element 132 such that the forming of the upper reflective element 104 may simultaneously form the second electrical contact element 132.

The upper reflective element 104 may be formed as one or more continuous layers extending over an entire area in which the light sensor 100 is to be formed. The upper reflective element 104 may form a layer arranged above the surface of the photo-sensitive element 114 and parallel therewith.

For instance, the upper reflective element 104 may be formed by thin-film deposition. This may provide a possibility to use materials which do not need to be adapted for use with semiconductor processing steps. The upper reflective element 104 may be formed by a plurality of layers arranged on top of each other for forming a DBR.

The stack of layers formed as described above define resonance structures 102a, 102b, 102c between the upper reflective element 104 and the lower reflective element 106 for providing resonance of light dependent on the wavelength of light. The spacer element 108 is configured to control the resonance wavelength.

The forming of a pattern of the lower reflective element 106 and/or the spacer element 108 may define pixels that extend through the stack of layers and are spaced apart in a direction parallel to the planes of the layers. The pixels may thus be defined by the lower reflective element 106 and/or the spacer element 108, whereas other elements of the light sensor 100 need not be patterned and may extend continuously over the entire area of the light sensor 100.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A light sensor for spectrally resolved light detection, said light sensor comprising:
   an upper reflective element;
   a lower reflective element;
   a photo-sensitive element arranged between the upper reflective element and the lower reflective element;
   a spacer element, which is configured to form the lower reflective element or is arranged between the upper reflective element and the lower reflective element;
   wherein the elements form a stack of layers with the elements arranged in mutually unique planes, parallel to each other, and wherein the stack of layers define a resonance structure between the upper reflective element and the lower reflective element for providing a resonance of light dependent on a wavelength of the light;

wherein the spacer element comprises at least two different materials, wherein a distribution of the at least two different materials in a direction parallel to a plane of the spacer element is different between different pixels in an array of pixels of the light sensor such that a resonance wavelength is different for different pixels;

wherein, for a plurality of pixels in the array of pixels, geometrical structures having a size smaller than the resonance wavelength are defined by the at least two different materials; and wherein, for a plurality of pixels in the array of pixels, the spacer element is formed as a metamaterial, wherein periodicity of the geometrical structures is sufficiently low such that light diffraction of the resonance wavelength is not caused by the metamaterial.

2. The light sensor according to claim 1, wherein the distribution of the at least two different materials controls an effective refractive index of the spacer element.

3. The light sensor according to claim 1, wherein the spacer element is configured to enable flow of charges from the photo-sensitive element through the spacer element.

4. The light sensor according to claim 3, wherein a first material of the at least two different materials is configured to enable flow of charges through the spacer element and wherein the first material of the spacer element is semiconductive.

5. The light sensor according to claim 1, wherein the light sensor is configured to receive light to be detected through the upper reflective element.

6. The light sensor according to claim 1, wherein the first material of the spacer element is a metal, semiconductor, or a dielectric material and a second material of the at least two different materials of the spacer element is a metal, a semiconductor, or a dielectric material.

7. The light sensor according to claim 1, wherein, for each pixel, the spacer element comprises a first region and a second region, and wherein the first material is arranged in the first region in a common manner for all pixels, and wherein the distribution of the at least two different materials in the second region is different between different pixels.

8. The light sensor according to claim 7, wherein a height of structures of at least one of the two different materials in the second region is different between different pixels.

9. The light sensor according to claim 1, wherein the photo-sensitive element comprises quantum dots configured to detect infrared light.

10. The light sensor according to claim 1, further comprising a substrate carrying read-out circuitry for reading out signals from the photo-sensitive element for each pixel representative of an amount of detected light, wherein the stack of layers is arranged on the substrate with the photo-sensitive element arranged between the substrate and the upper reflective element.

11. The light sensor according to claim 10, wherein the lower reflective element is formed by a metal layer arranged on the substrate.

12. The light sensor according to claim 1, wherein the upper reflective element is formed by multiple layers forming a distributed Bragg reflector.

13. The light sensor according to claim 1, further comprising an electrical contact element in the stack of layers, wherein the electrical contact element is configured to form part of the upper reflective element or is configured to be arranged between the upper reflective element and the photo-sensitive element and which is configured to form electrical contact with the photo-sensitive element.

14. The light sensor according to claim 1, further comprising a first transport layer and a second transport layer arranged on opposite sides of the photo-sensitive element in the stack of layers.

15. The light sensor according to claim 1, wherein pixels are arranged in groups comprising a sub-set of pixels configured to detect different wavelengths of light, wherein the groups are repetitively arranged in the array of pixels such that the light sensor is configured to provide imaging with spatial and spectral resolution.

16. A method for manufacturing a light sensor, said method comprising:

forming a spacer element on a surface of a substrate carrying read-out circuitry, wherein the spacer element comprises at least two different materials distributed in a direction of a plane parallel to the surface of the substrate, wherein the spacer element forms a lower reflective element or is arranged on a layer of the substrate forming a lower reflective element;

planarizing the spacer element to form a smooth top surface of the spacer element;

forming a photo-sensitive element above the top surface of the spacer element;

forming an upper reflective element above the photo-sensitive element;

wherein the elements form a stack of layers with the elements arranged in mutually unique planes, parallel to each other, and wherein the stack of layers define a resonance structure between the upper reflective element and the lower reflective element for providing a resonance of light dependent on a wavelength of the light;

wherein the spacer element comprises at least two different materials, wherein a distribution of the at least two different materials in a direction of a plane of the spacer element is different between different pixels in an array of pixels of the light sensor such that a resonance wavelength is different for different pixels;

and wherein the spacer element is configured to enable flow of charges from the photo-sensitive element through the spacer element, wherein, for a plurality of pixels in the array of pixels, geometrical structures having a size smaller than the resonance wavelength are defined by the at least two different materials, wherein, for a plurality of pixels in the array of pixels, the spacer element is formed as a metamaterial, wherein periodicity of the geometrical structures is such that light diffraction of the resonance wavelength is not caused by the metamaterial.

* * * * *